Sept. 3, 1968 D. B. COOPER 3,400,369

PULSE DOUBLET COMMUNICATION SYSTEM

Original Filed Jan. 14, 1963 7 Sheets-Sheet 1

INVENTOR
DAVID B. COOPER
BY Herbert W. Arnold
ATTORNEY

INVENTOR
DAVID B. COOPER
BY Herbert W. Arnold
ATTORNEY

INVENTOR
DAVID B. COOPER
BY Herbert W. Arnold
ATTORNEY

INVENTOR
DAVID B. COOPER

BY Herbert W. Arnold

ATTORNEY

PULSE DOUBLET COMMUNICATION SYSTEM

Original Filed Jan. 14, 1963 7 Sheets-Sheet 5

INVENTOR
DAVID B. COOPER
BY Herbert W. Arnold
ATTORNEY

INVENTOR
DAVID B. COOPER
BY Herbert W. Arnold
ATTORNEY

PULSE DOUBLET COMMUNICATION SYSTEM

Original Filed Jan. 14, 1963 7 Sheets-Sheet 7

INVENTOR
DAVID B. COOPER
BY Herbert W. Arnold
ATTORNEY

United States Patent Office 3,400,369

Patented Sept. 3, 1968

3,400,369

PULSE DOUBLET COMMUNICATION SYSTEM

David B. Cooper, New York, N.Y., assignor to Raytheon Company, Lexington, Mass., a corporation of Delaware Continuation of abandoned application Ser. No. 251,389, Jan. 14, 1963. This application May 8, 1967, Ser. No. 637,006

18 Claims. (Cl. 340—167)

ABSTRACT OF THE DISCLOSURE

A communication system for communicating information in which the information to be communicated is encoded in the form of pulse doublets each having a constant energy content.

This is a continuation of Ser. No. 251,389, filed Jan. 14, 1963 and now abandoned.

This invention relates to communication systems, and more particularly to a communication system in which information to be communicated is encoded in the form of pulse doublets.

It is often desired to transmit information or data which is generated at one point to some other remote point. The manner in which this information is transmitted usually involves a compromise between speed, power and available bandwidth. In many cases, where data is transmitted, a datum or reference must be indicated at the time the data is occurring and is sent in "real time" as distinguished from sending such reference much later. For example, in pulse amplitude modulation systems wherein data is represented by the absolute amplitude of the pulses, a reference pulse or datum is transmitted periodically which can be used to determine the absolute magnitude of the received pulses and thereby the information contained in the pulses.

In the apparatus of the present invention, information is contained in the relative amplitude between two pulses comprising a pulse doublet. Accordingly, it is not necessary to transmit a reference pulse periodically as is required in the aforementioned pulse amplitude modulation system, since the decoding apparatus provided in the present pulse doublet system responds to the relative amplitude between two pulses in a pair as contrasted to the absolute value of pulses in the pulse amplitude modulation system.

Furthermore, since data can become stale or lose its value if delayed too long in transmission, the speed of transmission is important in many applications. Accordingly, the pulse doublet communication system of the present invention provides communication apparatus for increasing the number of bits of information transmitted per unit time through a bandwidth limited channel at the price of an increased signal-to-noise ratio. The pulse doublet communication system encodes information into two pulses which when taken together form a doublet. The unambiguous representation of, for example, four binary bits of information by two pulses instead of four bits yields a two-to-one improvement in channel capacity. Furthermore, in the pulse doublet system the information or data to be transmitted is contained in the relative amplitude between each pulse in the pulse doublet in such a manner that the usual problem of detecting amplitude levels in the presence of "fading," i.e., variations of the absolute gain over the transmission line, is avoided.

In the present invention, each pulse doublet has a constant or equal energy content as compared to each succeeding or preceding pulse doublet. Accordingly, the communication transmitter apparatus may be operated at full power at all times, thus providing maximum power efficiency. In addition, by virtue of the fact that each pulse doublet has a constant energy content, it is also possible in accordance with the invention to assure sampling of the pulse doublet at intervals corresponding to the beginning and end of the pulse doublets by comparing successive squared and summed pulse pairs and using any resultant difference signal produced by such comparison to shift the sampling interval so as to sample only successive pulse pairs forming a true pulse doublet, that is, a pair of pulses having a constant energy content.

It is a further feature of the present invention that the probability of error in the detection process is equal or constant over the whole range of information communicated.

Other objects, features and advantages of the pulse doublet communication system according to the present invention will be better understood by the following description, taken together with the accompanying drawings in which.

Figure 4A:
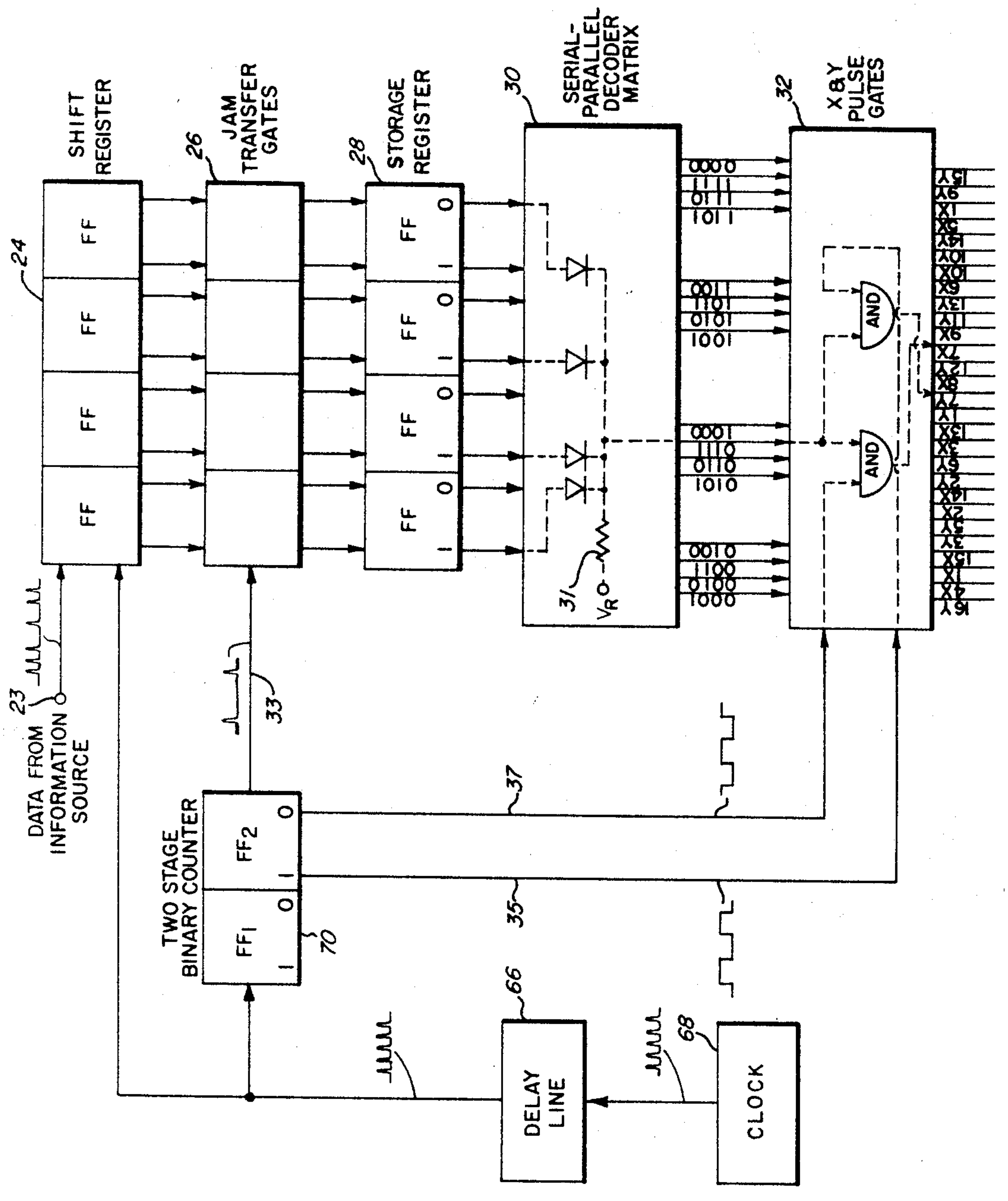
Figure 4B:
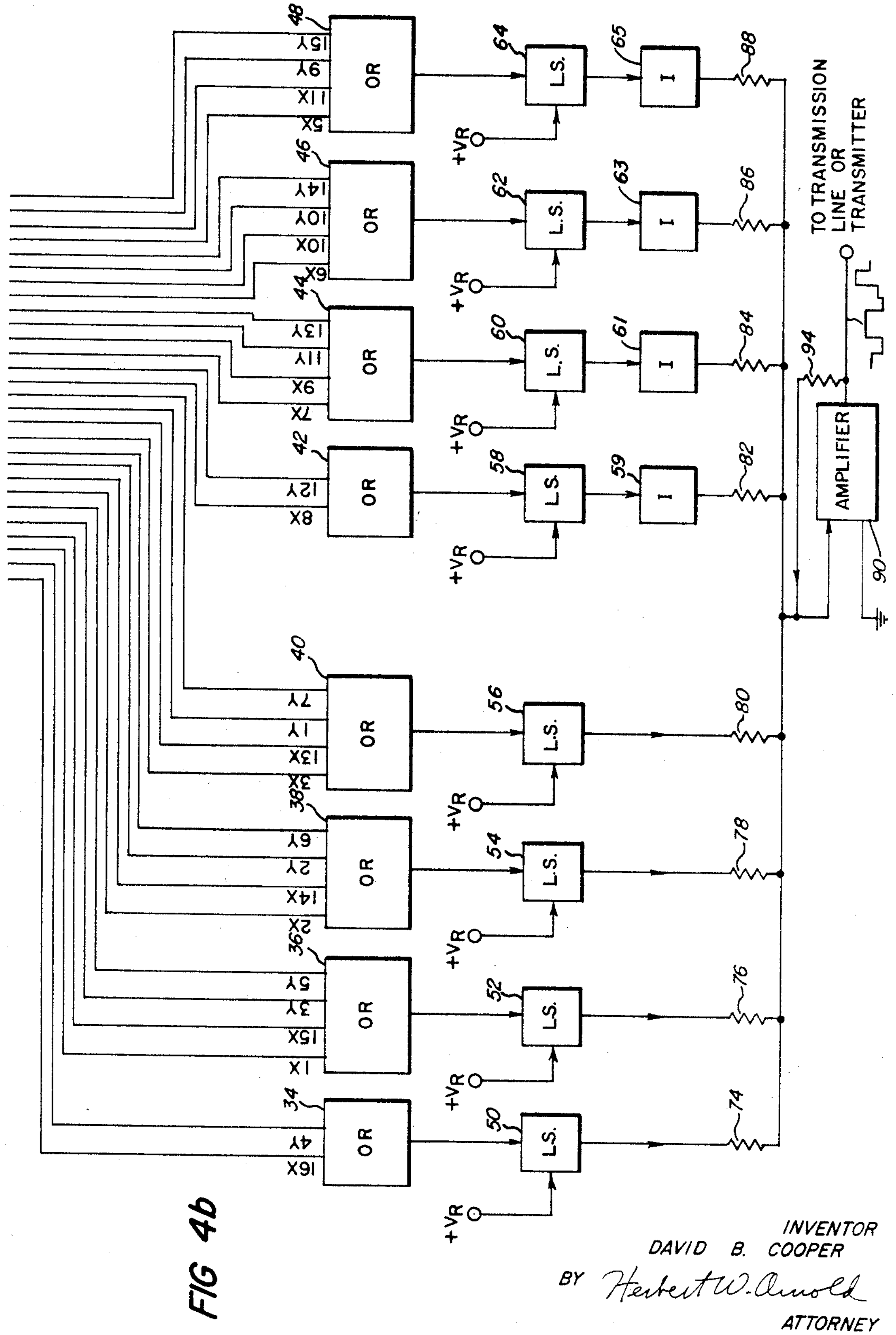

FIGS. 4*a* and 4*b* show a specific embodiment of a pulse doublet encoder of the present invention.

Figure 5:
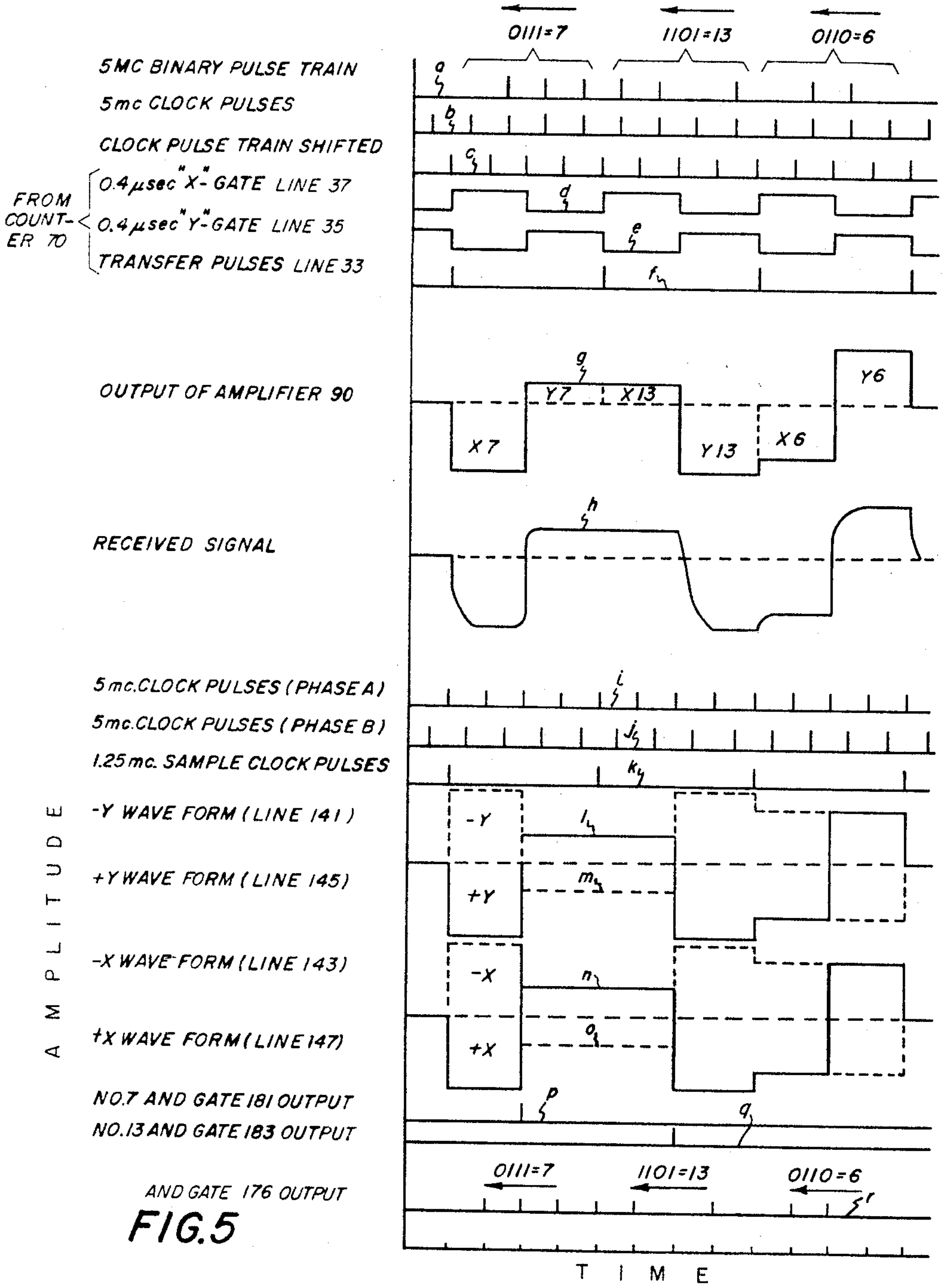
Figure 6A:
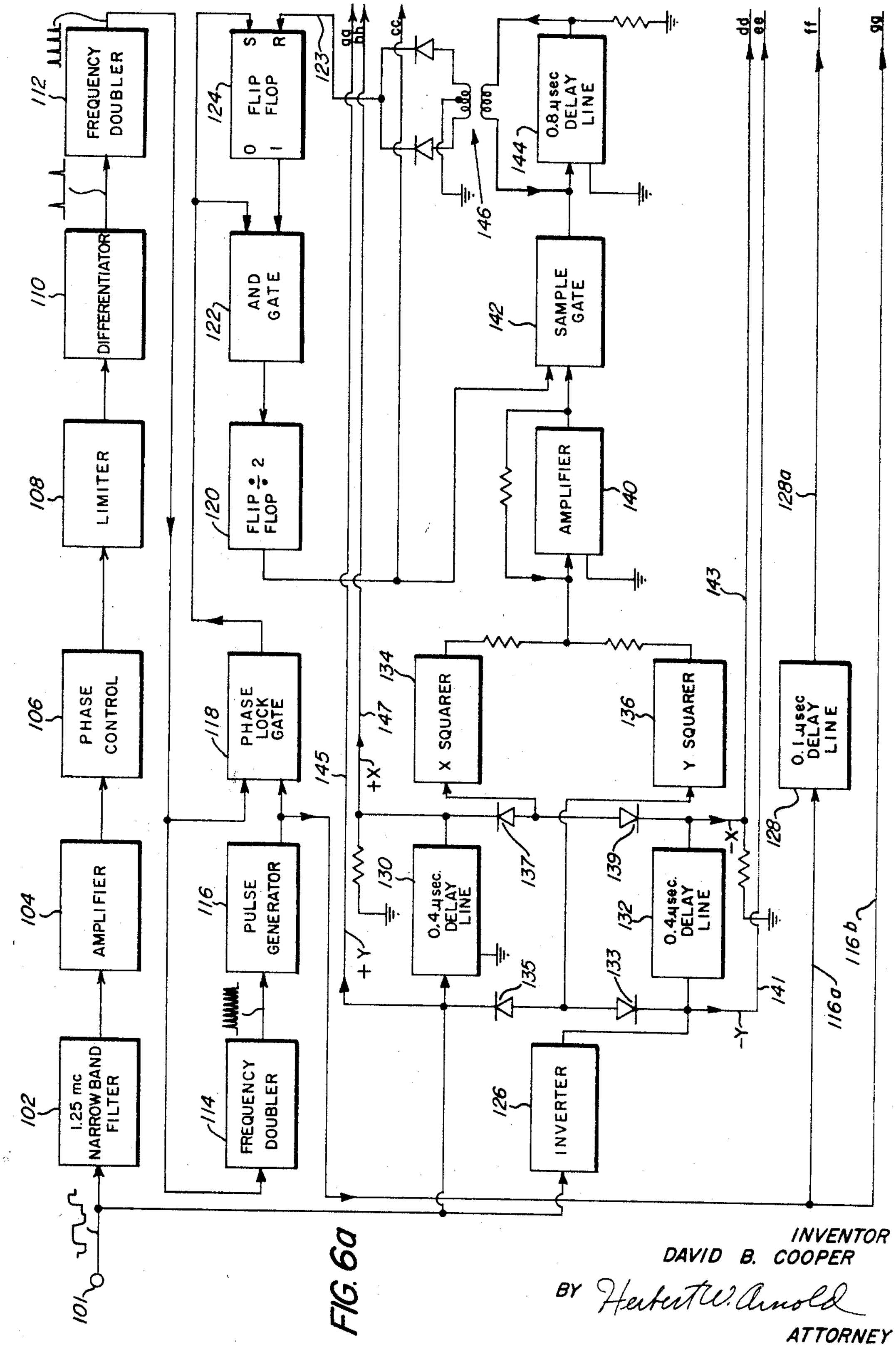
Figure 6B:
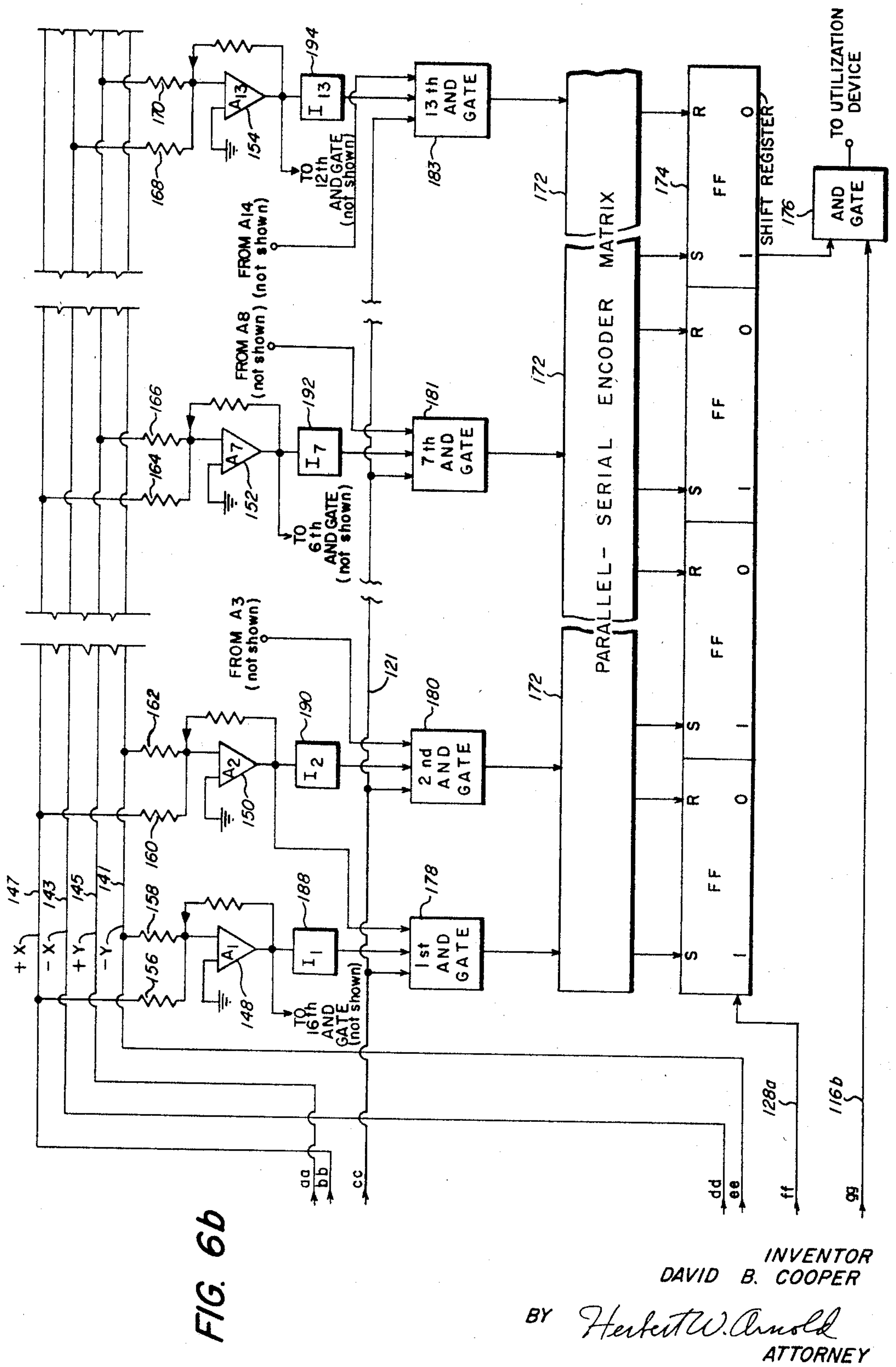

FIG. 5 shows waveforms used in explaining the operation of the encoder of FIGS. 4*a* and 4*b* and the decoder of FIGS. 6*a* and 6*b*.

FIGS. 6*a* and 6*b* show a specific embodiment of a pulse doublet decoder of the present invention.

Figure 7:
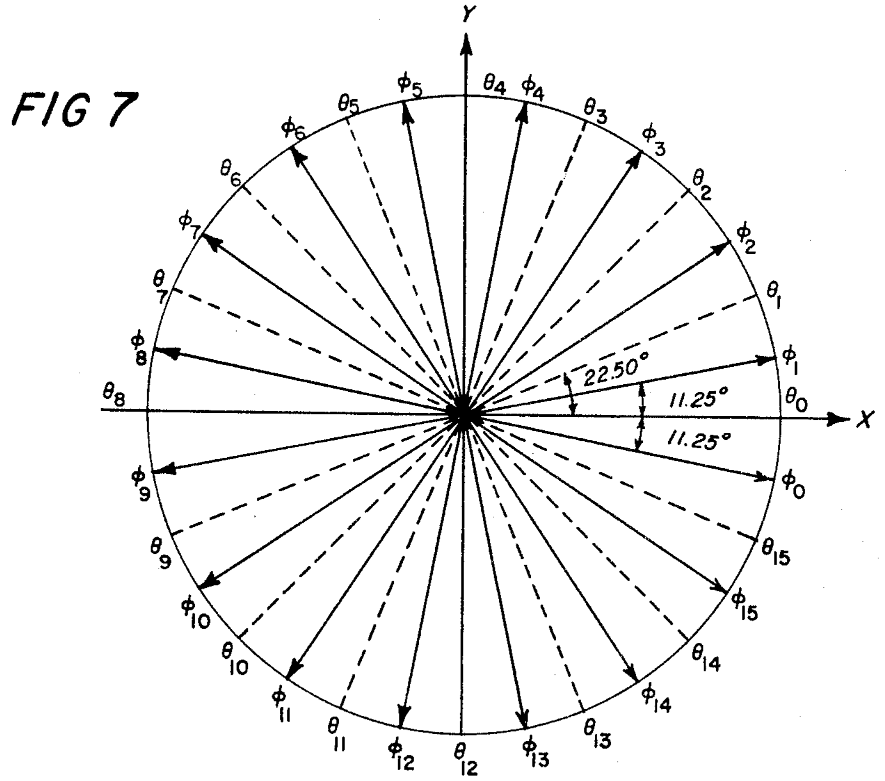
Figure 8:
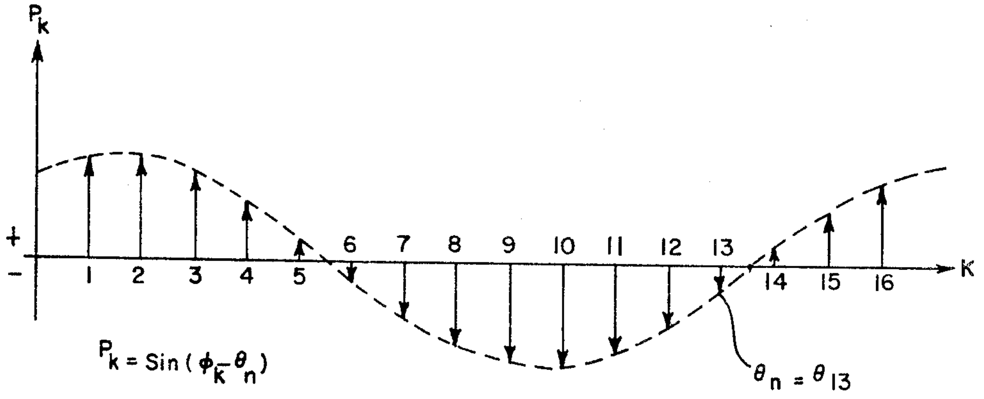

FIGS. 7 and 8 illustrate a pulse doublet decoding concept of the decoder of FIGS. 6*a* and 6*b*.

Figure 1:
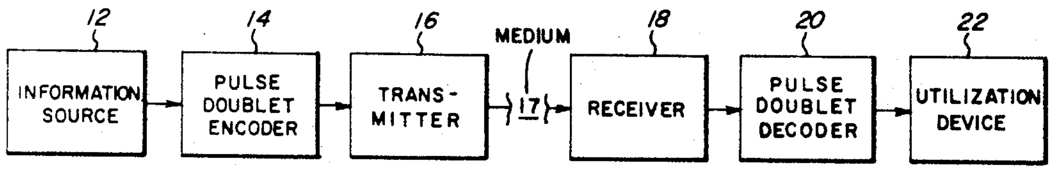
FIG. 1 shows in block diagram form, a communication system of the present invention.

Referring now to FIG. 1, there is shown a source of information 12 which information is generated at a first location. It is desired to transmit this information, which may, for example, be television signal data, voice communication data or radar signal data, to some remote location over medium 17 for subsequent detection and utilization at said remote location. It is the purpose of the pulse doublet encoder 14 to encode the data from source 12 in such a manner that efficient utilization of transmitter 16 will occur and that problems of detection which result from "fading" phenomena associated with transmission media, such as medium 17, will be minimized. In accordance with the present invention, therefore, a communication encoding system comprising pulse doublets of constant energy is utilized to encode raw data from source 12 prior to modulation of the transmitted carrier of transmitter 16.

For purposes of illustration, the pulse doublet encoder 14 of FIG. 1 utilizes a 16-level pulse doublet system. However, it should be noted that any level including the 4-level or higher could be used to advantage in the present system and the use of a 16-level system is not meant to be a limitation of the invention in any manner.

Figure 3:
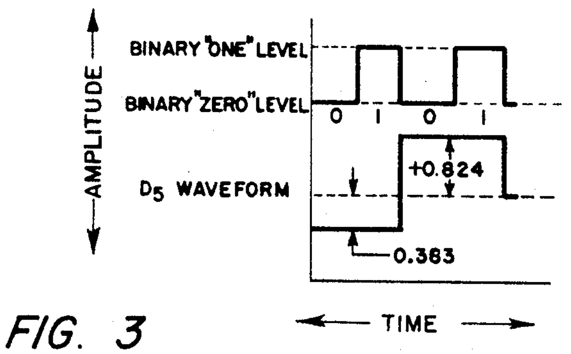
FIG. 3 shows waveforms used in describing the pulse doublet feature of the invention.

In a 16-level pulse doublet system each pulse doublet is made to represent one of 16 possible values, and hence can be made to represent unambiguously the same information as is contained in, for example, four successive pulse positions of a binary pulse train. Assume, for purposes of illustration, that the information source 12 of FIG. 1 generates information in the form of a pulse train of binary bits. In accordance with the present invention the binary pulse train from source 12 is divided into successive blocks, or "words," each 4 digits long. Each of these "words" is in turn converted into a corresponding pulse doublet, wherein each pulse doublet consists of 2 adjacent pulses, and represents 4 digits of the original binary pulse train, such as shown in FIG. 3. The final output of the pulse doublet encoder is a train of pulse doublets in which the pulse rate, or frequency, is half that of the original train. This result is the reason why the output train of pulse doublets requires only half as much transmission bandwidth as required by the original train of binary pulses.

Figure 2:
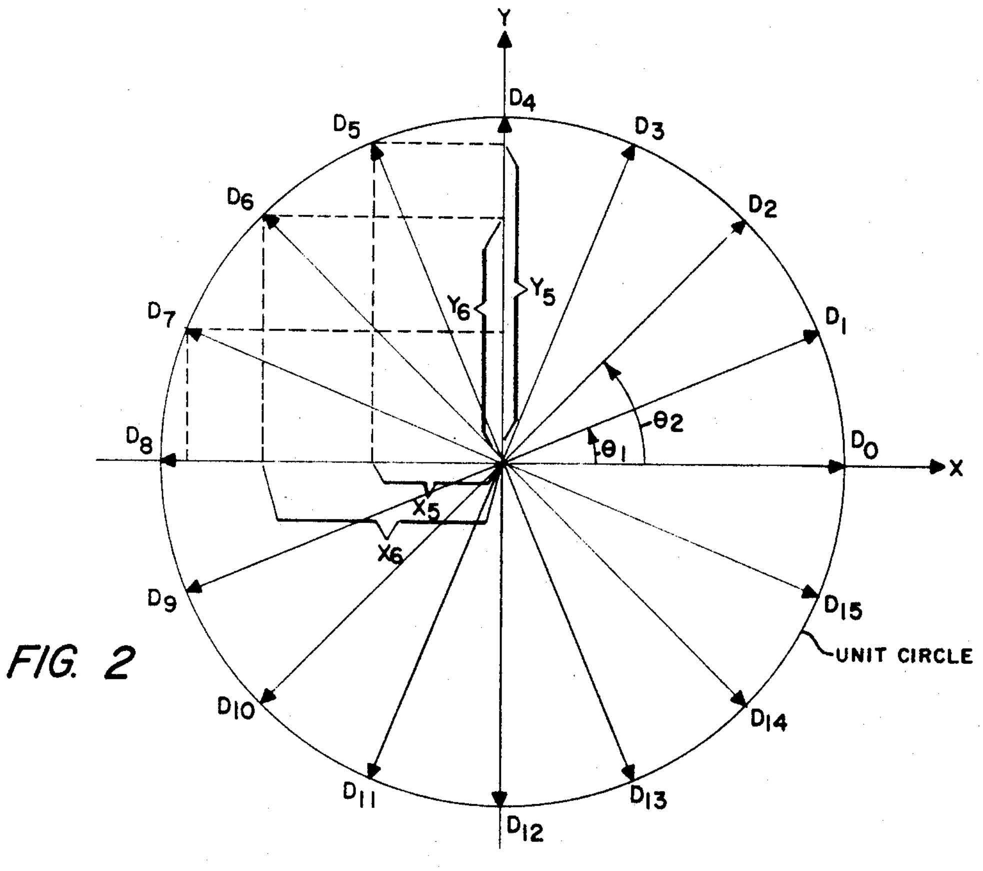
FIG. 2 illustrates the pulse doublet encoding concept of the present invention.

The transformation or encoding of the successive pulse positions of the binary pulse train into a 16-level pulse doublet system may be understood by a consideration of FIG. 2 which shows a vector diagram of a particular 16-level pulse doublet encoding system of the invention.

In FIG. 2, each of the numbers 0 through 15 is represented by one vector of a unit circle in vector space so that a total of sixteen vectors are distributed equally throughout the vector space. Each vector is equally spaced from each other vector by the angle $\theta$ which equals 22.5 degrees. Assume for the purpose of explanation that a group of four bits (0101) shown in FIG. 3 or the decimal number "5" is desired to be encoded. The number 5 is represented in vector space by the vector $D_5$ in FIG. 2. This vector is in turn defined by its cosine and sine components which are designated as $X_5$ and $Y_5$, respectively. For the case in point, then, the vector $D_5$ is determined by the ordered pair of numbers ($X_5$, $Y_5$) or numerically ($-0.383$, $+0.924$) as shown in FIG. 3. It is noted, at this point, that each of the sixteen vectors are defined by other pairs of numbers which give unique magnitudes for the pulses in each doublet. The ordered pair of numbers which define vector $D_5$ are used to define the amplitudes of the two pulses which form the pulse doublet $D_5$. Thus, the first pulse of doublet $D_5$ has an amplitude which represents the cosine of the vector $D_5$, or $-0.383$, while the sine component of the vector $D_5$ gives the magnitude of $+0.924$ for the second pulse as illustrated in FIG. 3.

It is further noted from the relation $X^2+Y^2=R^2$ that the square of the length of any vector in FIG. 2 is the signal energy or, stated in other terms, the area under the curves of each doublet is the signal energy of the doublet and it is a constant ($R^2$) making the energy equal for each and every doublet. Thus, all signals or pulse doublets have the same energy and each signal vector will undergo the same change in length when propagated through a "fading" channel. This feature of constant energy transmission will subsequently be shown to be of great advantage in the process of decoding and synchronization which occurs in decoder 20 of FIG. 1 and is more particularly described in association with FIGS. 6*a* and 6*b*.

It can also be seen from an analysis of FIG. 2 that, since all vectors lie in equally spaced chord relationship about the unit circle circumference, the probability of incorrectly decoding $D_5$ is no greater than the probability of incorrectly decoding any other doublet.

Furthermore, since reliable communication necessitates that the distance between vector tips be always greater than a certain minimum value to avoid erroneous detection due to noise interference, it should be noted that by doubling the circle radius, as by increasing signal power by a factor of 4, the number of transmissible signals, each separated by the same equally spaced chord relationship of the unit circle shown in FIG.2, can be doubled in size. In other words, the data rate can be doubled, that is, increased by one bit per signal without loss in reliability by doubling the circle radius, i.e., by increasing signal power by a factor of 4.

Returning now to FIG. 1 so as to complete the description of the communication device of the present invention, there is shown a transmitter 16 coupled to the pulse doublet encoder 14 which encoder performs the encoding function described in connection with FIGS. 2 and 3. The output of the encoder comprises a series of pulse doublet pairs containing information in the form of magnitude variations between each pulse in the doublet. The total energy in each doublet is constant as compared to the energy in each successive doublet. The doublets are coupled to transmitted 16 which, for example, may be a high frequency oscillator, and are used to modulate a carrier signal as by frequency, phase or other well known modulation technique. The carrier signal is then transmitted through medium 17 which may, for example, be a telephone wire, underground cable, or simply air to a receiver 18 located at some remote point from transmitter 16.

Receiver 18 detects the carrier modulations in the appropriate well-known manner and reproduces the original series of pulse doublets which most probably will have suffered some distortion and fading in passage through the medium 17. Pulse doublet decoder 20 reverses the aforementioned encoding process occurring in encoder 14 in a manner subsequently described in detail in connection with FIGS. 6*a* and 6*b* to reproduce the original informational data generated by information source 12. The data output from decoder 20 is coupled to utilization device 22 which may, for example, be a television receiver, storage drum, punch tape machine or other such device for utilizing the information generated by source 12.

Reference is had now to FIGS. 4*a* and 4*b* which, in conjunction with the waveform diagrams of FIG. 5, may be used to describe a particular embodiment of the pulse doublet encoder 14 of FIG. 1. The pulse doublet encoder of FIGS. 4*a* and 4*b* is a 16-level pulse doublet encoder adapted to convert information encoded in the form of binary pulse trains such as that shown on curve *a* of FIG. 5 to pulse doublets such as that shown on curve *g* of FIG. 5. For purposes of illustrating this embodiment it is assumed that the original binary pulse train comprises pulses of 0.2 microsecond duration which occur at a 5 megacycle rate. The resultant pulse doublet period for this embodiment will be 0.8 microsecond, each doublet occurring at a rate of 1.25 megacycles or a pulse rate at the output of the encoder of FIGS. 4*a* and 4*b* of 2 pulses per doublet times 1.25 megacycles which equals 2.5 megacycles, and wherein each pulse in the doublet has a period of 0.4 microsecond. This result can best be seen by a consideration of curves *a* and *g* of FIG. 5.

Referring specifically now to FIG. 4*a*, there is shown a 4-digit shift register 24 comprising 4 flip-flop circuits connected as a 4-stage shift register. Shift register 24 is synchronized by 5 megacycle clock pulses from master clock 68, delayed 0.1 microsecond in delay line 66. The delay is provided to ensure sampling periods commence at intervals between the pulses of the binary pulse train.

The clock pulses are shown on curve *b* of FIG. 5 and the delayed clock pulses on curve *c* of FIG. 5. The original binary pulse train from an information source is coupled from input lead 23 to shift register 24. Shift register 24 samples 4 digits of the binary pulse train and stores the pulse train in the form of On-Off states of the 4 flip-flop circuits. For example, when the first 4 digits of binary pulse train *a* of FIG. 5 enter storage register 24 they are recorded, reading from right to left on FIG. 4*a*, as states 0, 1, 1, 1 or the equivalent of decimal number 7. This 4-digit binary number in the following described apparatus is encoded to its equivalent pulse doublet number $D_7$ comprising a first 0.4 microsecond pulse of amplitude $-0.924$ and a second pulse of amplitude $+0.383$ as shown in curve *g* of FIG. 5.

At every fourth clock pulse the contents of register 24 are jam-transferred by well known jam-transfer gate circuitry 26 into a 4-digit storage register 28, which serves to hold these 4 digits while the shift register 24 is accumulating the next 4 digits of the binary pulse train. In this illustration, as shown in FIG. 5, curve *a*, the next 4 digits are 1101 or the decimal number 13 which corresponds to pulse doublet $D_{13}$. The jam-transfer mechanism is made to operate on every fourth clock pulse by feeding a portion of the aforementioned clock pulse outputs of delay line 66 to a two-stage binary counter 70 which comprises 2 flip-flops connected as a divide-by-four binary counter. One output of counter 70 shown on line 33 of FIG. 4*a* and curve *f* of FIG. 5 consists of a set of transfer pulses occurring at intervals of 0.8 microsecond. This output from line 33 is used to operate jam-transfer gate circuitry 26 at every fourth digit accumulated in shift register 24. During the interval that shift register 24 is accumulating the second set of 4-digit binary pulses, the contents of storage register 28 are read into serial-parallel decoder matrix 30 which serves to channel the information stored in register 28 in binary-serial form to the appropriate one of sixteen possible combinations or parallel output lines from matrix 30. For example, a suitable matrix for converting the 4-digit binary 0111 to one of the 16 output leads from matrix 30 is shown in dotted lines within unit 30 to comprise 4 parallel connected diodes coupled to a biasing voltage through a bias resistor 31 such that a pulse will be produced at the line designated 0111 only when the contents of storage register 28 consist of the flip-flop states of 0111, reading from right to left on register 28. Similar matrices are provided in matrix 30 for each of the 16 possible combinations. Accordingly, the output of matrix 30 will consist of a pulse at an appropriate one of 16 possible outputs at any instant of time. Each of the 16 output lines from matrix 30 is further gated in gate circuitry 32 by a 0.4 microsecond "X-gate," which coincides in time with the first pulse or "X-pulse" of the corresponding pulse doublet and by a 0.4 microsecond "Y-gate" which coincides in time with the second pulse or "Y-pulse" of the doublet. These X and Y-gates are derived from the original 5-megacycle clock 68 by means of the 2-stage binary counter 70, previously mentioned, and are shown on FIG. 5, curves *d* and *e* respectively, and lines 37 and 35 respectively of FIG. 4*a*. The apparatus required for gating of the pulse output from line 0111 of matrix 30 and included in pulse gate circuitry 32 is illustrated in dotted lines within unit 32. As can be seen in the dotted lines, the "X-gate" pulse from the "zero" state of flip-flop $FF_2$ of counter 70 is coupled along line 37 to a first AND gate designated X-AND and the "Y-gate" pulse from the "ONE" state of flip-flop $FF_2$ of counter 70 is coupled along line 35 to a second AND gate designated Y-AND in circuit 32. The output pulse from serial-parallel decoder matrix 30 corresponding to the binary digit 0111 is coupled to each of the aforementioned AND gates. Thus, when both the "X-gate" and the pulse corresponding to 0111 are present at the inputs to the X-AND gate an output pulse occurs at the X-AND gate and is channeled out of unit 32 to an appropriate one of 28 output leads. In the present instance the 7X output line is activated. Similarly, when a "Y-gate" and a pulse corresponding to 0111 is present simultaneously at the input to the Y-AND gate an output signal is channeled to a second appropriate output lead 7Y of the 28 output lead combination from unit 32. Accordingly, it can be seen that the X and Y pulse gate circuitry of unit 32 comprises a suitable set of 32 AND gates fed by the sixteen outputs from matrix 30 and the "X" and "Y-gates" from binary counter 70.

The 28 output leads shown in FIG. 4*a* from pulse gate circuitry 32 are continued into FIG. 4*b* and are fed to individual input leads provided on the 8 OR gates, 34, 36, 38, 40, 42, 44, 46 and 48 of FIG. 4*b*. Thus, for example, the aforementioned X-AND gate output from unit 32 of FIG. 4*a* corresponding to 0111 is coupled to OR gate 44 of FIG. 4*b* and in particular to the 7X input lead of OR gate 44. Likewise, the Y-AND gate of unit 32 of FIG. 4*a* is coupled to the 7Y input lead of OR gate 40, FIG. 4*b*. When a pulse appears at any one of the input leads to OR gates 34 through 48 a signal is produced at the output of the appropriate OR gate which is then coupled to an appropriate one of the 8 level standardizers, 50, 52, 54, 56, 58, 60, 62 and 64. Level standardizers 50 through 64 comprise electronic switches or diode devices which connect the output leads of each level standardizer to either ground or to a reference voltage designated $V_R$ from a source not shown. Accordingly, it can be seen that for a given input to storage register 28, such as the 4-digit pulse binary 0111, a standard reference voltage will occur only at the outputs of level standardizers 56 and 60. The output from level standardizer 60 will occur first in time corresponding to the "X-pulse" portion of pulse doublet $D_7$ and the output from level standardizer 56 will occur next in time for a period corresponding to the "Y-gate" time duration of 0.4 microsecond and the "Y-pulse" portion of doublet $D_7$.

In a 16-level pulse doublet, the *n*th doublet $D_n$ has, for its "X-pulse" amplitude, an amplitude corresponding to the cos $\theta_n$ which is equal to $$\cos\left(n\times\frac{360°}{16}\right)$$

or cos (22.5 $n°$), and for its "Y-pulse" amplitude sin $\theta_n$ or sin (22.5$n°$). Simple trigonometry shows that the range of values assumed by these quantities is limited to the following values: ±1, ±0.924, ±0.707, ±0.383, and 0.

The 4 positive values, +1, +0.924, +0.707 and +0.383, required, are provided by the 4 levels standardizers 50, 52, 54 and 56 which when coupled as shown to resistors 74, 76, 78 and 80, respectively, feed positive currents of appropriate value to the input of operational amplifier 90. Amplifier 90 acts as a summing network and is preferably a high gain amplifier having negative feedback coupled through resistor 94. Each positive current is obtained by applying the aforementioned reference voltage $V_R$ to a resistor whose magnitude is inversely proportional to the pulse amplitude required. For example, the magnitude of resistor 74 is 1 ohm, resistor 76 is $1/_{.924}$, resistor 78 is $1/_{.707}$ and resistor 80 is $1/_{.383}$ ohms. The four negative values required are provided in a similar manner by level standardizers 58, 60, 62 and 64, each of which is coupled to a separate polarity inverter, respectively 59, 61, 63 and 65, which feeds a negative current of the required value through resistors 82, 84, 86 and 88 respectively to the input of the operational amplifier 90. Inverters 59, 61, 63 and 65 are, for example, operational amplifiers having a unity gain of minus one. It should be noted here, however, that the same resultant negative signal could be obtained without said inverters by connecting level standardizers 58, 60, 62 and 64 to reference voltage source $V_R$ in opposite polarity to the connection of level standardizers 50, 52, 54 and 56. The output of each level standardizer is at zero level or grounded except during activation by the application of a gate pulse. Each level standardizer, therefore, makes no contribution to the summing network 90 and hence to the output, except when so activated. Thus, continuing to trace the path of the 4-digit binary 0111 which calls for a pulse doublet comprising an "X-pulse" of −.924 and a "Y-pulse" of +0.383, such pulse is provided by activating level standardizers 56 and 60 as aforementioned which draw current through resistors 80 and 84 respectively, each of said resistors having the aforementioned appropriate values to produce the desired output pulse from amplifier 90.

It should be noted that when an output pulse of "zero" amplitude is called for such as the "Y-pulse" of $D_8$ of FIG. 2, no gate pulse is applied to any of the level standardizers. Hence, omitting those gate pulses which correspond to a "zero" output pulse amplitude, i.e., $X_4$, $X_{12}$, $Y_8$ and $Y_0$, there are thus required only 14 "X-gates" and 14 "Y-gates." These are routed to the appropriate level standardizers as shown in FIG. 4*b* in such a way that for each input combination a pair of consecutive 0.4 microsecond pulses, each having the proper amplitude and polarity, appears at the output of amplifier 90, to form the corresponding pulse doublet. The output of amplifier 90 which is the final output of the encoder of FIGS. 4*a* and 4*b* is fed to a suitable transmitter device if appropriate or alternatively may be transmitted directly out a cable or other medium to the decoder of FIGS. 6*a* and 6*b*.

Reference is had now to FIG. 6*a* and to FIG. 6*b* which is an extension of FIG. 6*a* along lines *aa* through *gg*. FIGS. 6*a* and 6*b* taken together show in block diagram form a decoder of the present invention. It is the function of the pulse doublet decoder of FIGS. 6*a* and 6*b*, which correspond to the pulse doublet decoder 20 of FIG. 1, to identify each pulse doublet as it is received at input lead 101 and to reconstruct the original binary pulse train which may then be coupled to a suitable utilization device adapted to utilize the information contained in the original binary pulse train. To do this, it is first necessary to establish, at the decoder, clock pulses of the correct frequency and phase to sample the incoming signal. Referring specifically now to FIG. 6*a*, this is accomplished by applying the received signal, curve *h* of FIG. 5, to a narrow band filter 102, tuned to the doublet frequency of, for example, 1.25 mc. The output of filter 102 is coupled successively through an amplifier 104, adjustable phase control 106, limiter 108 and differentiator 110. Phase control 106 permits adjustment to compensate for any substantial phase shift occurring in amplifier 104. Limiter 108 clips in a known manner any signal to an input level suitable for the well known differentiator 110.

The output of differentiator 110 is the differential input signal of line 101 and can be readily seen to comprise pulses occurring at a rate of 1.25 megacycles. This output is in turn successively coupled to frequency doublers 112 and 114, and thence to a pulse generator 116 to produce a train of clock pulses at the desired 5 megacycle rate. These pulses correspond in frequency to the original clock pulses of FIG. 5. The output of pulse generator 116 is shown on curve *i* of FIG. 5. The input to filter 102 is shown on curve *h* of FIG. 5. All of the subsidiary clock pulses and sampling pulses required in the decoder of FIGS. 6*a* and 6*b* are derived from the pulse train output of pulse generator 116.

A portion of the received signal from input lead 101 is also coupled to inverter 126 and to delay line 130. The inverted output of inverter 126 is connected to delay line 132. Each delay line provides an 0.4 microsecond time delay so that the first pulse of a received doublet appears at the output of each delay line at the same time that the second pulse appears at the input. The output of delay line 130 is designated the +X pulse and the output of delay line 132 as the −X pulse by virtue of its having been inverted previously by passage through inverter 126. These delayed outputs are coupled to lines 143 and 147 for subsequent utilization in the detecting process specifically shown in FIG. 6*b*. Similarly, a portion of each of the inputs to delay lines 130 and 132 is coupled to lines 145 and 141 respectively prior to passage through said delay lines for subsequently described utilization in the detection process more particularly shown in FIG. 6*b*. The undelayed portions are designated as the +Y pulse and −Y pulse respectively and are shown along with the delayed pulses designated as +X and −X pulses on curves *l, m, n* and *o* of FIG. 5.

Two successive received pulses may or may not happen to constitute a doublet since we may have erroneously sampled the incoming signal at the instant when we have received the second pulse of one doublet and the first pulse of the succeeding doublet. In order to detect and correct this situation, use is made of the fact that the pairs of pulses which form doublets contain a constant amount of energy since their amplitudes are proportional to cos $\theta_n$ and sin $\theta_n$ respectively, and $\cos^2 \theta_n + \sin^2 \theta_n = 1$. From the preceding relation, it will be observed that by squaring each sampled pulse in a doublet and summing the two squared pulses to produce a pulse whose amplitude is equal to the sum, then comparing the resultant pulse with each succeeding pulse, an error signal will be developed should two successive such pulses differ appreciably in amplitude. This error signal will indicate that the sampled pair of received pulses did not constitute a doublet and the error signal may then be used to adjust the phase of the sampling frequency to intervals which include a complete doublet.

In accordance with the invention therefore, the two Y pulses and the two X pulses which have been brought into time synchronism by passage of the X pulses through delay lines 130 and 132 are coupled to individual squarers 134 and 136 by means of diodes 133, 135, 137 and 139 which select only the negative going portions of each pulse for subsequent squaring in said squarers. The outputs of squarers 134 and 136 are added in summing amplifier 140 and then sampled in sample gate 142 which is an AND gate synchronized by 1.25 megacycle clock pulses occurring at intervals of 0.8 microsecond corresponding to the pulse doublet period and derived from the aforementioned pulse generator 116. The resulting pulse from sample gate 142, whose amplitude represents the energy of the chosen pair, is fed into an 0.8 microsecond delay line 144. This resulting pulse arrives at the output end of delay line 144 at the same time that the next such pulse is applied to the input of delay line 144. The amplitudes of the input and output pulses of delay line 144 are compared in a bipolar pulse comparator designated generally by the character 146. If the amplitudes differ appreciably, the pulse comparator by well known diode and transformer action, as shown, produces a difference pulse which indicates that the sampled pair of received pulses did not constitute a doublet. In the event that a difference pulse is generated by the comparator, it is coupled by lead 123 to trigger a flip-flop 124, which delays the phase of the 1.25 megacycle sampling clock pulses to sample gate 142 at the correct interval corresponding to the beginning and end of pulse doublet periods.

Delay of the phase of the 1.25 megacycle clock pulses is accomplished by coupling a portion of the 2.5 megacycle output from frequency doubler 112 and a portion of the 5 megacycle output from pulse generator 116 to a phase lock gate 118 which comprises an AND gate for producing an output pulse upon coincidence of the two input signals. Thus, the output of phase lock gate 118 comprises a train of clock pulses occurring at a rate of 2.5 megacycles and in phase with the output of doubler 112. A first portion of this output is coupled to AND gate 122 and a second portion to aforementioned flip-flop 124. Since flip-flop 124 provides the second input to AND gate 122 from its "one" state, and is shifted out of the "one" state by the aforementioned difference pulse from comparator 146, it is apparent that the action at AND gate 122 is such as to cause the omission of a pulse output at AND gate 122 upon the satisfaction of the above condition, i.e., an output from comparator 146. The omission of one pulse of the 2.5 megacycle pulse train output of AND gate 122, as determined by the aforesaid apparatus, delays the output of the divide-by-two flip-flop 120 by the required 0.4 microsecond needed to assure sampling at the correct doublet interval. Flip-flop 120 produces a pulse output at one-half the frequency of the input. Thus a 1.25 megacycle pulse train is coupled to previously mentioned sample gate 142 and to AND gates 178, 180, 181 and 183 of FIG. 6*b*.

Utilizing the sampling apparatus just described, it can be assumed that the incoming signal is being sampled at the correct instant, that it is a true doublet and that the amplitudes of its X and Y pulses can be obtained simultaneously. In other words, it has been established that some doublet, $D_n$, may be received and that the amplitudes of its X and Y pulses are proportional to cos $\theta_n$ and sin $\theta_n$, respectively, but which doublet it is has not been determined, i.e., the value of *n* designates the pulse doublet number from 0 to 15 and which is not yet known. The value of *n* may be any one of the numbers 0–15 corresponding to the 16 vectors shown in FIG. 2.

It now remains to describe the apparatus of the invention in which each received doublet is identified unambiguously. To do this it is necessary first to consider FIGS. 7 and 8, the latter figure showing the function $$P_K=\sin\phi_K\cos\theta_n-\cos\phi_K\sin\theta_n=\sin(\phi_K-\theta_n)$$

in which $\phi_K$ is allowed to assume any of 16 values, designated $\phi_0, \phi_1 \ldots \phi_{15}$, (i.e. $K=0, 1 \ldots 15$) as shown in FIG. 7. The values of $\phi$ are so chosen as to lie midway between the values of $\theta$ which was used to create the original code shown in FIG. 2 such that: $\phi_1-11.25°$, $\phi_2=33.75° \ldots \phi_{15}=348.75°$ (since $\theta_1=22.5°$, $\theta_2=45° \ldots \theta_{15}=360°$). Thus: $\phi_n=\theta_n-11.25°$, $$\phi_{n+1}=\theta_{n+1}-11.25°=\theta_n+11.25°$$

From the above it can be shown that the only value of K for which $P_K$ is negative and $P_{K+1}$ is positive simultaneously is the value $K=n$.

$$(P_n=\sin(\phi_n-\theta_n)=\sin(-11.25°)<0$$

$P_{n+1}=\sin(\phi_{n+1}-\theta_n)=\sin(+11.25°)>0)$. Stated another way, the only value of K for which $-P_K$ and $+P_{K+1}$ are both positive is the value $K=n$. It is this principle which is used to identify $n$, and hence the received doublet $D_n$, which, in turn, represent one of the 4-digit binary numbers as shown in FIG. 3.

FIG. 8, for example, shows a plot of values of $P_K$ as a function of K for a typical value of $\theta_n$ where $\theta_n$ is selected to equal $\theta_{13}$. From the plot it is seen that $\theta_n$ must equal $\theta_{13}$ so that the received doublet was $D_{13}$ since it will be observed in FIG. 8 that $-P_K$ and $+P_{K+1}$ are both positive only for $K=13$.

Referring again now to FIG. 6, pulses are produced whose amplitudes are proportional to the 16 values of $P_K$, namely $P_0, P_1 \ldots$ and $P_{15}$ by applying the aforementioned received $\pm X$ and $\pm Y$ pulses on their respective lines 145, 147, 141 and 143 (whose amplitudes were encoded to be proportional to $\cos\theta_n$ and $\sin\theta_n$, respectively) to pairs of resistors, such as 156 and 158, whose resistance values are made proportional to $1/\sin\phi_K$ and $1/\cos\phi_K$ respectively, and subtracting algebraically, such as in operational summing amplifier 148 which is an operational amplifier identical to amplifier 140 of FIG. 6*a*, the resultant current in the latter from that in the former. There will thus be 16 pairs of such resistors and 16 resultant pulses, although for purposes of illustration, only the 1st, 2nd, 7th and 13th are shown, connected respectively to amplifiers 148, 150, 152 and 154. It should be observed that since these resistors alone cannot represent negative values of $\sin\phi_K$ and $\cos\phi_K$, the appropriate sign for each term is obtained by coupling to the appropriate resistor pairs either the positive or the negative value of the X or Y pulse, as is necessary for obtaining subtraction of the two pulses in summing amplifiers 148, 150, 152 and 158. For example, the values of the first resistor pair are made proportional to $1/\cos\phi_1$ and $1/\sin\phi_1$ which are equal to $$\frac{1}{\cos+11.25°}$$

and $$\frac{1}{\sin+11.25°}$$

or $$\frac{1}{+0.981}$$

and $$\frac{1}{+0.195}$$

respectively. Since the sine of $+11.25°$ is a positive value, resistor 158 is connected to the $-Y$ line and resistor 156 is connected to the $+X$ line to obtain subtraction when the two quantities are added. Had $\sin\phi_K$ been a negative number such as when K equals zero or $\sin\phi_K=\sin -11.25°$ or $\sin 384.75°=-0.195$, then the $1/\sin\phi_K$ resistor would be connected to the $+Y$ line.

The 16 resultant pulses out of amplifiers 1–16 corresponding to $+P_0, +P_1 \ldots +P_{15}$ are applied to 16 inverters although again only the 1st, 2nd, 7th and 13th inverters designated 188, 190, 192 and 194 respectively are shown. The outputs of each inverter, corresponding to $-P_0, -P_1 \ldots -P_{15}$, are fed to one of the three inputs of an apropriate one of 16 AND gates, the 1st, 2nd, 7th and 13th being shown. The second input to said AND gates comprises an appropriate one of the 16 output pulses from amplifiers 1–16 aforementioned. Thus, the Kth AND gate has as its inputs pulses corresponding to $-P_K$ and $+P_{K+1}$.

In accordance with the previous analysis in connection with FIGS. 7 and 8, it will thus be seen that only one of the AND gates has two positive inputs at any given moment in time, namely that for which $K=n$. The $n$th AND gate is therefore the only one which produces an output pulse, and this identifies the received doublet as $D_n$.

Once the identity of the receiver doublet is established as above, the process of reconstructing the original binary pulse train is essentially the reverse of that which takes place in the pulse doublet encoder of FIGS. 4*a* and 4*b*. Each of the 16 AND gate outputs, four which, 178, 180, 181 and 183 are shown, is synchronized with the 1.25 megacycle pulse train from flip-flop 120 on line 121 by coupling said pulse train to each of said AND gates and thereby allowing an output from said AND gates only when signals are present at all three input leads. Each of the 16 AND gate outputs is then converted into the corresponding 4-digit binary number by a parallel-to-serial encoder matrix 172 which is a diode matrix wired inversely to that of the matrix described in conjunction with the description of matrix 30 of FIG. 4*a*. The outputs of matrix 172 correspond to the eight inputs to matrix 30 from storage register 28 of FIG. 4*a*. Curves *p* and *q* of FIG. 5 represent the pulse outputs of the 7th and 13th AND gates corresponding respectively to gates 181 and 183.

The output of matrix 172 is periodically fed to shift register 174 and comprises a signal on one line only of each pair of 4 pairs of wires emanating from matrix 172. These outputs correspond to outputs of shift register 24 of FIG. 4*a*. The signal on said wires is the serial binary digit information corresponding to the parallel information present at the input to matrix 172 and is used to set the states of each of four flip-flops in shift register 174 accordingly. The contents of register 174 are continuously shifted out by intermediate phase B, 5 megacycle clock pulses derived from pulse generator 116 via line **116*a* and delayed by 0.1 microsecond in delay line 128 before being applied to the appropriate flip-flop stage of shift register 174 by way of line 128*a***. The final output pulse train of the decoder of FIGS. 6*a* and 6*b* is obtained by gating undelayed 5 megacycle clock pulses on line **116*b* with the end digit of shift register 174 in AND gate 176. This pulse train will be the same as the original input pulse train at terminal 23** of FIG. 4*a* except for transmission delays present in the system. There is shown on line *j* of FIG. 5 the 5 megacycle phase B pulses, on line *i* the undelayed or phase A pulses and the sample clock pulses from flip-flop 120 on link *k*. The output of AND gate 176 is also shown on line *r* of FIG. 5. This output may be coupled to a suitable utilization device such as a digital-to-analog converter or other such device for utilizing the information decoded by the decoder of the invention.

This completes the description of the preferred embodiment of the invention. However, many modifications of the invention will be apparent to persons skilled in the art. For example, in some applications it may be preferred to transmit sampling pulses of the correct frequency and phase for sampling the pulse doublet train by a separate channel. In that case, the filter 102, amplifier 104, phase control 106, limiter 108 and differentiator 110 may be omitted from the encoder of FIGS. 6*a* and 6*b*. Accordingly, it is desired that this invention not be limited except as defined by the appended claims.

What is claimed is:

1. Apparatus comprising:
a generator including an encoder for coding information in the form of pulse doublets, said pulse doublets comprising pairs of pulses, each pulse in a pair bearing a predetermined relationship with each other pulse in accordance with the information to be coded and each of said pulse doublets having a constant energy content as compared with each other pulse doublet, and a transmitter for transmitting said pulse doublets.

2. Data apparatus comprising:
a generator for producing pulse doublets of such data, each of said pulse doublets comprising a pair of square pulses, each pulse in a pair having a pre-established proportionality between each other pulse in the pair, said proportionality being relatable to such data, and each of said pulse doublets having a constant energy value, said generator comprising counter means for generating first and second gating signals; circuit means responsive to said data and to said gating signals for selectively generating third and fourth signals; and a plurality of level standardizers responsive to said third and fourth signals for generating said pulse doublet.

3. Apparatus for encoding binary data:
means responsive to said binary data for generating a plurality of pairs of square pulses, one of said pulses in a pair having a magnitude proportional to the sine of an angle, the other of said pulses in said pair having a magnitude proportional to the cosine of said angle; said means comprising a two stage binary counter for generating first and second gating signals; circuit means responsive to said binary data and to said gating signals for selectively generating third and fourth signals; and a plurality of level standardizers responsive to said third and fourth signals for generating a pair of said square pulses.

4. In combination:
means for generating a plurality of pairs of waves, one of said waves in a pair having a magnitude proportional to the sine of an angle, the other of said waves in said pair having a magnitude proportional to the cosine of said angle;
and means for selectively varying the sine and cosine of said angle of each of said pairs of waves in accordance with input information.

5. Apparatus for encoding binary data:
means responsive to said binary data for generating information in which the information to be generated is represented by predetermined magnitude relations between each pulse in a pair of pulses and wherein the total energy in each of said pair of pulses is constant; said means comprising a decoder matrix responsive to said binary data for generating a selected signal; counter means for generating two successive gating signals; gating circuitry means responsive to said selected signal and to said gating signals for generating first and second signals; and, a plurality of level standardizers responsive to said first and second signals for producing a pair of said pulses;
and means responsive to said predetermined magnitude relation for deriving said information.

6. Apparatus comprising:
means for transmitting equal energy content pulse pairs;
means connected to said transmitting means for coding said pulse pairs with information, said coding comprising a predetermined amplitude ratio relation between the pulses of each pair; and
means for receiving said pulse pairs.

7. In combination:
means for generating data in the form of successive pairs of pulses, each of said pairs of pulses having a total energy equal to the total energy of each preceding pair of pulses, said data being contained in said pulses by a predetermined amplitude ratio relationship between each pulse in a pair;
and means for deriving said data from said pairs of pulses.

8. Apparatus comprising:
means for transmitting pairs of waves having information encoded therein, said information being represented by the amplitude ratio relation between each wave in a pair of waves; each pair of waves having an area within the curve of said waves which is equal to the area of each succeeding and preceding pair of waves and means for encoding the information contained in said pairs of waves.

9. Apparatus comprising:
means for generating pairs of square pulses bearing data in the form of magnitude variations between each pulse in a pair of pulses, one of said pulses in a pair being proportional to the sine of an angle $\theta_n$, the other of said pulses in a pair being proportional to the cosine of said angle $\theta_n$, wherein *n* may be any number and denotes the particular datum to be borne by a particular pair of pulses, said means including a plurality of selectively operable level standardizers for producing said pairs;
means responsive to said generating means for sampling said pairs of pulses at intervals corresponding to the beginning and end of said pairs of pulses related by the aforesaid sine and cosine relationship;
and means coupled to said sampling means for detecting the particular datum borne by said sampled pair of pulses.

10. In combination:
means for transmitting pairs of square pulses bearing data in the form of magnitude variations between each pulse in a pair of pulses, one of said pulses in a pair being proportional to the sine of an angle $\theta_n$, the other of said pulses in a pair being proportional to the cosine of said angle $\theta_n$, wherein *n* may be any number and denotes the particular datum to be borne by a particular one of said pairs of pulses, each of said pairs of pulses having a constant relationship with each other pair of pulses as determined by the relationship $\sin \theta_n^2 + \cos \theta_n^2 = 1$, said means including a plurality of selectively operable level standardizers for producing said pairs;
means responsive to said constant relationship for sampling said pairs of pulses at intervals corresponding to the beginning and end of pulse pairs related by the aforesaid sine and cosine relationship;
and means coupled to said sampling means for detecting the particular datum borne by said sampled pair of pulses.

11. A pulse digit communication system comprising:
means for sampling said digits at predetermined intervals;
means responsive to said sampled digits for producing pulse pairs at intervals corresponding to said sampling interval, one of said pulses in a pair being proportional in magnitude to the sine of an angle $\theta_n$, the other of said pulses in a pair being proportional in magnitude to the cosine of said angle $\theta_n$, wherein $\theta_n$ may represent a particular vector angle in a vector system having *n* spaced vectors related such that the cosine squared plus the sine squared of each vector is equal to unity, and wherein $\theta_n$ corresponds to a particular set of sampled digits;
sampling means responsive to said pulse pairs for successively sampling and squaring each pulse in a pair and summing said squared pulses at intervals corresponding to the period of said pulse pairs;

means responsive to said successively squared and summed sampled pulses for shifting the sample interval a time duration corresponding to one-half the period of said pulse pairs should said successively summed pulses differ in magnitude;

and means responsive to said sampled pulses for reproducing said sampled digits.

12. A communication system for communicating information contained in pulse digits comprising:

means for sampling said digits at fixed intervals;

means responsive to said sampled digits for producing pulse pairs at intervals corresponding to said sampling interval, one of said pulses in a pair being proportional in magnitude to the sine of an angle $\theta_n$, the other of said pulses in a pair being proportional in magnitude to the cosine of said angle $\theta_n$, wherein $\theta_n$ represents a particular vector angle in a vector system having $n$ equally spaced vectors related such that the cosine squared plus the sine squared of each vector is equal to unity;

receiving means including means responsive to said pulse pairs for successively sampling and squaring each pulse in a pair and summing said squared pulses at intervals corresponding to the period of said pulse pairs;

means responsive to said successively squared and summed sampled pulses for shifting the sample interval a time duration corresponding to one-half the period of said pulse pairs whenever said successively summed pulses differ in magnitude;

and means responsive to the relative amplitude of the pulses in said sampled pulse pairs for reproducing said sampled digits.

13. In combination:

means for generating data in the form of successive pairs of pulses, each of said pairs of pulses having a total energy equal to the total energy of each preceding pair of pulses, said data being contained in said pulses by a predetermined amplitude ratio relationship between each pulse in a pair;

means for deriving said data from said pairs of pulses;

means responsive to said generating means for sampling said pairs of pulses at intervals corresponding to the beginning and end of said pairs of pulses related by the aforesaid amplitude ratio relationship including means for successively squaring and summing pulse pairs, means for comparing said squared and summed pulse pairs to produce a difference signal, and means responsive to said difference signal for shifting the sampling interval;

and means coupled to said sampling means for detecting the particular datum borne by said pair of pulses.

14. In combination:

means for generating a plurality of pairs of waves, one of said waves in a pair having a magnitude proportional to the sine of an angle, the other of said waves in said pair having a magnitude proportional to the cosine of said angle;

means for selectively varying the sine and cosine of said angle of each of said pairs of waves in accordance with input information;

and receiving means for deriving said input information from said pairs of waves.

15. In combination:

means for generating successive pairs of pulses, each pair having a magnitude which varies as the sine and cosine of an angle;

means for varying the sine and cosine of said angle according to an information code;

and means for deriving said information code.

16. In combination:

means for generating a plurality of pairs of waves;

means for varying the magnitude of each wave in a pair according to the sine and cosine of an angle;

means for selectively varying the sine and cosine of said angle in accordance with input information;

and means for determining said angle from said magnitude variations.

17. Apparatus comprising:

a transmitter for generating and transmitting a train of signal pulses arranged in successive groups all consisting of the same number of pulses and means for so modulating the pulses in each group in response to an input signal that the modulation of the pulses of each group of modulated pulses represent an individual part of the information from the input signal and the variations of the pulses in each group are fixedly related to one another with respect to energy content.

18. Apparatus comprising: the elements as set forth in claim 17 and including:

a receiver for receiving the signal pulses, the receiver comprising an oscillation generator for generating control oscillations having a period equal to the period of recurrence of the said groups, combining means for combining sets of the received signal pulses or pulses derived therefrom, the sets of pulses each containing the same number of pulses as each of the said groups, and the combination being made in accordance with the same law as that in which the transmitted pulses in each group are fixedly related, a comparator for comparing the result of the combination for each set with the result of the combination for the succeeding set, a control device arranged in response to a difference between the results from two successive sets to change the phase of the control oscillations by an amount equal to 360°/$m$ where $m$ is the number of pulses in each of the said groups and a demodulator controlled by the control oscillations adapted to demodulate the received information.

References Cited

UNITED STATES PATENTS

| | | | |
|---|---|---|---|
| 2,625,604 | 1/1953 | Edson | 178—6 |
| 2,949,505 | 8/1960 | Kretzmer | 325—38 |
| 3,051,928 | 8/1962 | Sullivan | 340—345 |
| 3,123,670 | 3/1964 | Kaenel | 178—66 |
| 3,128,342 | 4/1964 | Baker | 178—67 X |
| 3,133,280 | 5/1964 | Crater | 340—352 |
| 3,196,351 | 7/1965 | Slepian | 325—38 X |
| 3,209,259 | 9/1965 | Huber | 178—67 X |
| 3,160,874 | 12/1964 | Hamori | 340—347 |
| 3,184,734 | 5/1965 | Uren et al. | 340—347 |
| 3,196,430 | 12/1965 | Oken et al. | 340—347 |

JOHN W. CALDWELL, *Primary Examiner.*

D. J. YUSKO, *Assistant Examiner.*